(12) United States Patent
Sharma

(10) Patent No.: US 11,715,469 B2
(45) Date of Patent: Aug. 1, 2023

(54) METHODS AND APPARATUS FOR IMPROVING SEARCH RETRIEVAL USING INTER-UTTERANCE CONTEXT

(71) Applicant: Walmart Apollo, LLC, Bentonville, AR (US)

(72) Inventor: Arpit Sharma, Santa Clara, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 201 days.

(21) Appl. No.: 17/187,163

(22) Filed: Feb. 26, 2021

(65) Prior Publication Data
US 2022/0277740 A1    Sep. 1, 2022

(51) Int. Cl.
G10L 15/22     (2006.01)
G10L 15/26     (2006.01)
G06F 40/205    (2020.01)
G06F 40/279    (2020.01)

(52) U.S. Cl.
CPC ............ *G10L 15/22* (2013.01); *G06F 40/205* (2020.01); *G06F 40/279* (2020.01); *G10L 15/26* (2013.01)

(58) Field of Classification Search
CPC ....... G10L 15/22; G10L 15/26; G06F 40/205; G06F 40/279; G06F 40/30
See application file for complete search history.

(56) References Cited

U.S. PATENT DOCUMENTS

| | | | |
|---|---|---|---|
| 10,460,215 B2 | 10/2019 | Herold et al. | |
| 10,614,799 B2 | 4/2020 | Kennewick, Jr. et al. | |
| 10,923,111 B1* | 2/2021 | Fan | G10L 15/16 |
| 11,194,962 B2* | 12/2021 | Biswas | G06N 3/045 |
| 11,200,506 B2* | 12/2021 | Wu | G06F 40/30 |
| 11,232,154 B2* | 1/2022 | Guo | G06F 16/90332 |
| 2016/0132906 A1* | 5/2016 | Khavronin | G06Q 30/0201 705/7.29 |
| 2018/0143966 A1* | 5/2018 | Lu | G06V 10/454 |
| 2018/0181117 A1* | 6/2018 | Rosenberg | H04L 65/403 |

(Continued)

FOREIGN PATENT DOCUMENTS

| | | | | |
|---|---|---|---|---|
| CN | 1594139 B | * | 8/2017 | ............. G10L 15/22 |
| CN | 108763493 A | * | 11/2018 | ............... G06N 3/08 |

(Continued)

OTHER PUBLICATIONS

Rastogi, Abhinav, Dilek Hakkani-Tur, and Raghav Gupta. "An Efficient Approach to Encoding Context for Spoken Language Understanding." Retrieved from <https://research.google/pubs/pub47205.pdf> on May 16, 2023. (Year: 2018).*

(Continued)

*Primary Examiner* — Daniel C Washburn
*Assistant Examiner* — Oluwadamilola M Ogunbiyi
(74) *Attorney, Agent, or Firm* — Morgan, Lewis & Bockius LLP; Manita Rawat

(57) ABSTRACT

A system and method of improving the Natural Language Understanding of a voice assistant. A first utterance is converted to text and parsed by a Bi-LSTM neural network to create a vector representing the utterance. A subsequent utterance is similarly converted into a representative vector and the two vector are combined to predict the true intent of a user's subsequent utterance in context with the initial utterance.

20 Claims, 6 Drawing Sheets

(56) References Cited

U.S. PATENT DOCUMENTS

| | | | |
|---|---|---|---|
| 2018/0350353 A1* | 12/2018 | Gruber | G06F 40/205 |
| 2019/0188590 A1* | 6/2019 | Wu | H04L 51/02 |
| 2019/0278835 A1* | 9/2019 | Cohan | G06F 40/289 |
| 2019/0295536 A1* | 9/2019 | Sapugay | G10L 15/19 |
| 2020/0117856 A1* | 4/2020 | Kumar Karn | G06F 40/295 |
| 2020/0135178 A1* | 4/2020 | Park | G06F 21/76 |
| 2020/0151253 A1* | 5/2020 | Wohlwend | G06F 40/30 |
| 2020/0151254 A1* | 5/2020 | Wohlwend | G10L 15/16 |
| 2020/0184307 A1* | 6/2020 | Lipka | G06F 16/9032 |
| 2020/0228469 A1* | 7/2020 | Mullins | H04L 51/02 |
| 2020/0251091 A1 | 8/2020 | Zhao | |
| 2020/0279151 A1* | 9/2020 | Li | G06N 5/022 |
| 2020/0335095 A1* | 10/2020 | Yuan | G10L 15/1815 |
| 2020/0349919 A1 | 11/2020 | Wanas et al. | |
| 2021/0034635 A1* | 2/2021 | Agrawal | G06F 16/248 |
| 2021/0034705 A1* | 2/2021 | Chhaya | G06N 3/0445 |
| 2021/0065712 A1* | 3/2021 | Holm | G06V 40/20 |
| 2021/0082422 A1* | 3/2021 | Mondal | G10L 15/183 |
| 2021/0083994 A1* | 3/2021 | Pan | G06F 40/35 |
| 2021/0142794 A1* | 5/2021 | Mathias | G10L 15/22 |
| 2021/0174193 A1* | 6/2021 | Pouran Ben Veyseh | G06F 18/253 |
| 2021/0176371 A1* | 6/2021 | Yamazaki | H04N 1/00408 |
| 2021/0350915 A1* | 11/2021 | Letinic | G06F 40/30 |
| 2021/0374577 A1* | 12/2021 | Lin | H04L 67/1097 |
| 2021/0383199 A1* | 12/2021 | Weissenborn | G06N 3/063 |
| 2022/0130378 A1* | 4/2022 | Avijeet | G10L 13/027 |
| 2022/0270164 A1* | 8/2022 | Mehra | G06Q 20/20 |
| 2022/0277740 A1* | 9/2022 | Sharma | G06F 40/205 |
| 2022/0301082 A1* | 9/2022 | Dorch | G06V 20/52 |

FOREIGN PATENT DOCUMENTS

| | | | | |
|---|---|---|---|---|
| CN | 110134720 A | * | 8/2019 | G06F 16/2465 |
| CN | 111897941 A | * | 11/2020 | G06F 16/3329 |
| KR | 102262035 B1 | * | 6/2021 | G06N 3/08 |
| WO | WO-2020207035 A1 | * | 10/2020 | G10L 15/265 |
| WO | WO-2020261234 A1 | * | 12/2020 | G06F 16/2465 |

OTHER PUBLICATIONS

Zhou, Warren, "Building a Chat Bot Shopping Assistance for Super Brand Mall's WeChat," found at: https://microsoft.github.io/techcasestudies/bot framework/2017/06/21/CaaP-SuperBrandMall.html, 2017, 17 pages.

* cited by examiner

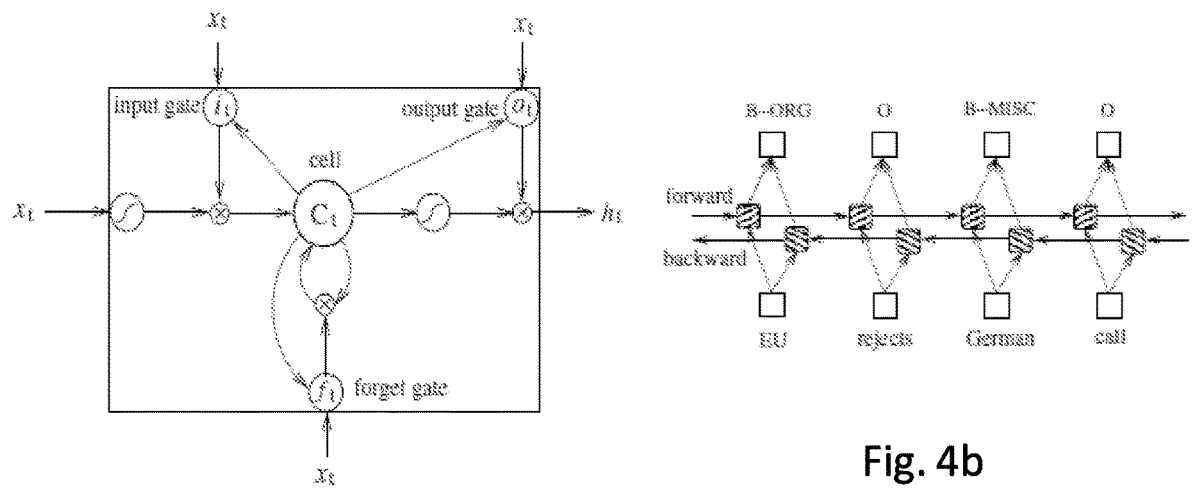
Fig. 4a
Prior art
Fig. 4b
Prior art
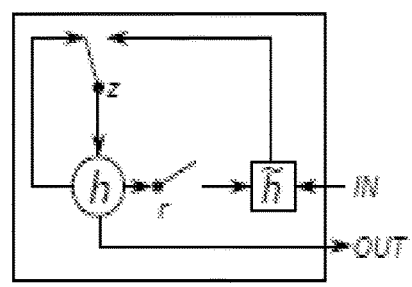
Fig. 4c
Prior art

METHODS AND APPARATUS FOR IMPROVING SEARCH RETRIEVAL USING INTER-UTTERANCE CONTEXT

TECHNICAL FIELD

The disclosed subject matter relates generally to automated assistants providing information from a database to a user in response to a user communication. Specifically, an automated shopping assistant providing relevant products by adjusting the search query using inter utterance context.

BACKGROUND

In recent years, with the development of cognitive intelligence technology, the success rate of speech recognition has been greatly improved, and applications based on speech recognition as well as natural language processing have also been comprehensively promoted. In addition to basic applications such as voice input, voice-based and text-based human-computer interaction applications such as voice and online assistants (i.e. automated assistants) have gradually become the standard configuration of intelligent systems. Such assistants can allow users to interact with devices or systems using natural language in spoken and/or text forms. For example, a user can provide a speech input containing a user request to an automated assistant operating on an electronic device. The digital assistant can interpret the user's intent from the speech input and operationalize the user's intent into tasks. The tasks can then be performed by executing one or more services of the electronic device, and a relevant output responsive to the user request can be returned. These automated assistants are being deployed, in lucrative domains such as e-commerce, customer service and healthcare. The goal being to free the consumer from the tedious task of buying stuff by visiting stores and websites.

There are four main aspects of a voice assistant, namely, Speech-to-Text, the Natural Language Understanding (NLU) component, Dialog Management (DM) and Text-to-Speech. The NLU component identifies intent(s) and entities in a user utterance. The dialog manager uses the output of the NLU component to prepare a suitable response for the user.

Current NLU systems tend to precisely understand an utterance in a dialog without providing context to the utterance. Leading to a challenge for voice assistants when the intent conveyed by a word is dependent on the context in which it is used. For example, an assistant must precisely understand that when a user says 'five' after a query to "add bananas to her cart" that the consumer intends to add five bananas to her cart. Whereas if a consumer says 'five' as her first utterance to the shopping assistant, then her intention is unknown (i.e., it does not represent any e-commerce action at the start of a conversation).

The NLU systems in the currently available voice or text enabled assistants, do not focus on inter-utterance context and hence the onus of context disambiguation lies upon the dialog manager.

Although it is possible to capture a small number of such cases in the dialog manager, it becomes difficult for it to scale for large number of contextually dependent utterances. For the example, where the user utterance 'five' after the utterance to add something to her cart, a dialog manager may predict its intent by using the rule: if previous intent=add to cart and the query is an integer then intent=add to cart else intent=un-known. But such a general rule cannot be created for many other queries such as 'organic please' (previous intent=add to cart, intent=filter) and 'stop please' (previous intent=add to cart, intent=stop).

There is thus a need for a NLU component which will utilize the context of a previous intent to aid in predicting the intent associated with a subsequent utterance.

SUMMARY

An aspect of the disclosure presents a computer implemented method of voice recognition and intent classification which may include the steps of: receiving a first utterance from a user; converting the first utterance into a first set of text data; parsing the first set of text data to identify a first set of key words; encoding a first intent vector from the first set of key words; storing the first intent vector as a first stored vector; receiving a second utterance from a user; converting the second utterance into a second set of text data; parsing the second set of text data to identify a second set of key words; encoding a second intent vector from the second set of key words; combining the second intent vector with the first stored vector forming a combined vector; forwarding the combined vector to a dialog manager, and storing a copy of the combined vector as a second stored vector; recognizing the intent, generating instruction to carry out the intent, and generating a text response to the user; converting the text response to speech that can be heard by the user.

According to some embodiments the step of forming a combined vector may further include receiving the second intent vector, receiving the first stored vector; concatenating the first stored vector to the second intent vector. According to some embodiments the step of forming a combined vector may further include: receiving the second intent vector, receiving the first stored vector, and performing a weighted sum of the second intent vector and the first stored vector. According to some embodiments the step of performing a weighted sum is performed by a gated recurrent unit (GRU). According to some embodiments the steps of forming a first intent vector and forming a second intent vector are performed by a bi-directional long short term memory (Bi-LSTM) network. According to some embodiments the step of generating a text response is performed by a dialog manager. According so to some embodiments the step of forwarding the combined vector to a dialog manager is performed by a feed forward unit. According to some embodiments a feed forward unit transfers the second intent vector to a GRU. According to some embodiments the step of receiving the first stored vector is performed by the GRU.

Another aspect of the disclosure presents a voice assistant which may include a microphone, a speaker, at least one memory, and a processor, where the processor is configured to carry out the instructions of: receiving a first utterance from a user; converting the first utterance into a first set of text data; parsing the first set of text data to identify a first set of key words; encoding a first intent vector from the first set of key words; storing the first intent vector as a first stored vector; receiving a second utterance from a user; converting the second utterance into a second set of text data; parsing the second set of text data to identify a second set of key words; encoding a second intent vector from the second set of key words; combining the second intent vector with the first stored vector forming a combined vector; forwarding the combined vector to a dialog manager, and storing a copy of the combined vector as a second stored vector; recognizing the intent, generating instruction to carry out the intent, and generating a text response to the user; converting the text response to speech that can be heard by the user.

According to some embodiments the step of forming a combined vector may further include receiving the second intent vector, receiving the first stored vector; concatenating the first stored vector to the second intent vector. According to some embodiments the step of forming a combined vector may further include: receiving the second intent vector, receiving the first stored vector, and performing a weighted sum of the second intent vector and the first stored vector. According to some embodiments the step of performing a weighted sum is performed by a GRU. According to some embodiments the steps of forming a first intent vector and forming a second intent vector are performed by a Bi-LSTM network. According to some embodiments the step of generating a text response is performed by a dialog manager. According to some embodiments the step of forwarding the combined vector to a dialog manager is performed by a feed forward unit. According to some embodiments a feed forward unit transfers the second intent vector to a GRU. According to some embodiments the step of receiving the first stored vector is performed by the GRU.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein:

FIG. 4a is an illustration of a LSTM cell usable with an embodiment of the disclosure.

FIG. 4b is an illustration of a Bi-LSTM network usable with an embodiment of the disclosure.

FIG. 4c is an illustration of a GRU usable with and embodiment of the disclosure.

Figure 1:
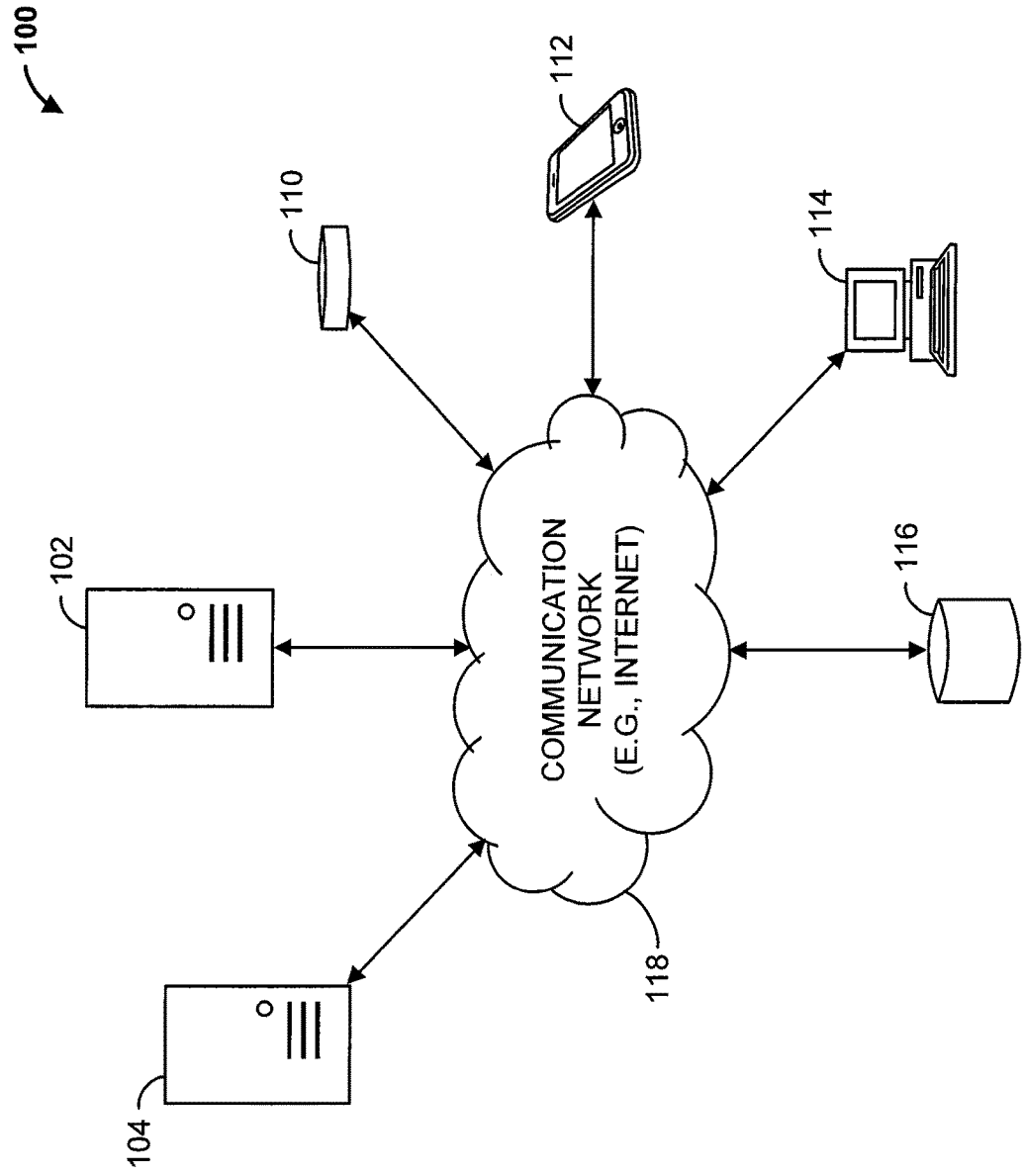
FIG. 1 is a block diagram of communication network used to retrieve relevant information contained in the knowledge base in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

DETAILED DESCRIPTION

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of a communication system 100 that includes an inter-utterance contextualizing computing device 102 (e.g., a server, such as an application server), a web server 104, database 116, and multiple customer computing devices 110, 112, 114 operatively coupled over network 118.

An inter-utterance contextualizing computing device 102, server 104, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, or through the communication network 118.

In some examples, the inter-utterance contextualizing computing device 102 may be a computer, a workstation, a laptop, a server such as a cloud-based server, or any other suitable device. In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, inter-utterance contextualizing computing device 102, and web server 104 are operated by a retailer, and multiple customer computing devices 112, 114 are operated by customers of the retailer.

Although FIG. 1 illustrates three customer computing devices 110, 112, 114, communication system 100 can include any number of customer computing devices 110, 112, 114. Similarly, the communication system 100 can include any number of workstation(s) (not shown), inter-utterance contextualizing computing devices 102, web servers 104, and databases 116 and 117.

The inter-utterance contextualizing computing device 102 is operable to communicate with database 116 over communication network 118. For example, the inter-utterance contextualizing computing device 102 can store data to, and read data from, database 116. Database(s) 116 may be remote storage devices, such as a cloud-based server, a disk (e.g., a hard disk), a memory device on another application server, a networked computer, or any other suitable remote storage. Although shown remote to the inter-utterance contextualizing computing device 102, in some examples, database 116 may be a local storage device, such as a hard drive, a non-volatile memory, or a USB stick. The inter-utterance contextualizing computing device 102 may store data from workstations or the web server 104 in database 116. In some examples, storage devices store instructions that, when executed by the inter-utterance contextualizing computing device 102, allow the inter-utterance contextualizing computing device 102 to determine one or more results in response to a user query.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Figure 2:
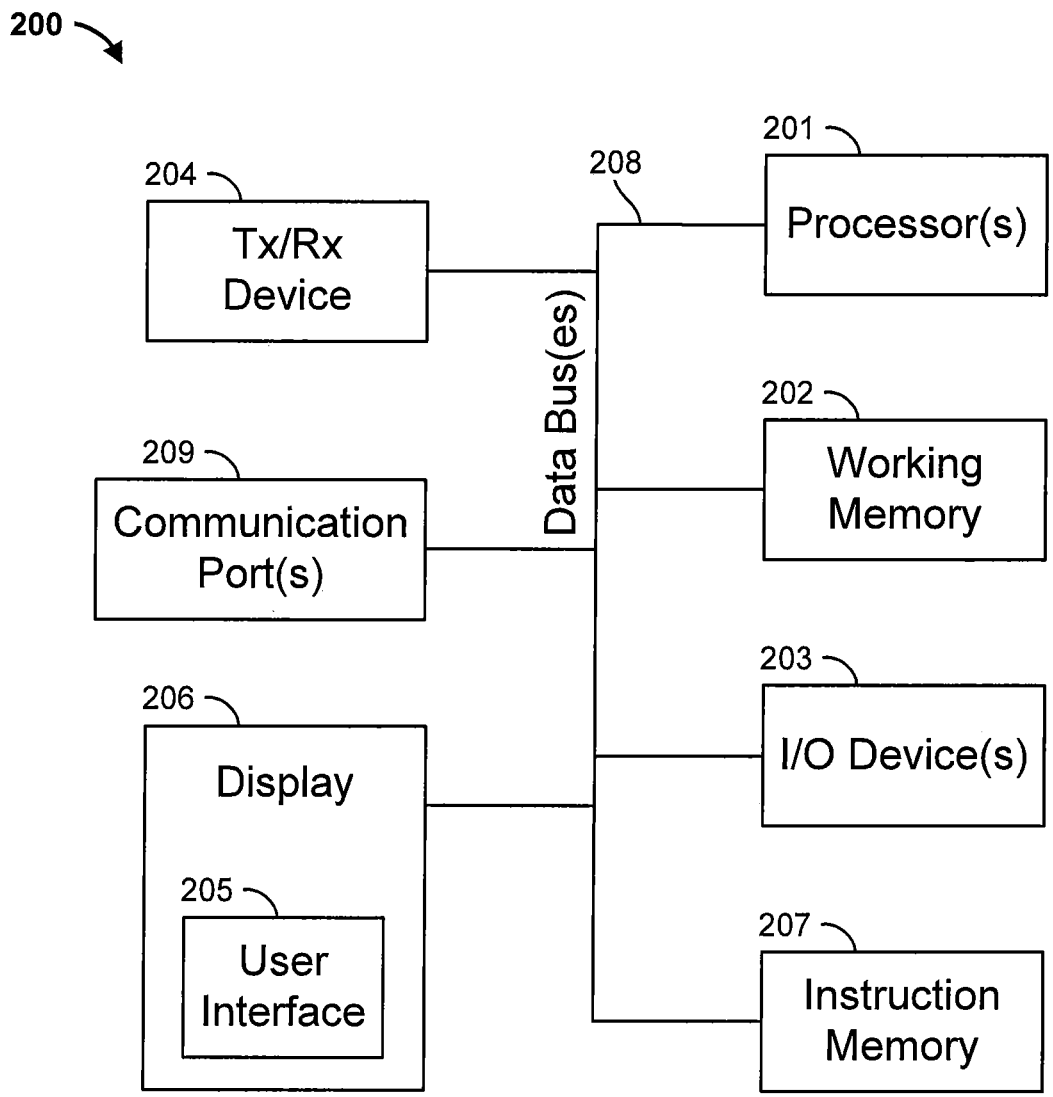
FIG. 2 is a block diagram of the computing device of the communication system of FIG. 1 in accordance with some embodiments.

FIG. 2 illustrates the inter-utterance contextualizing computing device 102 of FIG. 1. The inter-utterance contextualizing computing device 102 may include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more processing cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of the inter-utterance contextualizing computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as machine learning algorithm training data.

Display 206 can display user interface 205. User interfaces 205 can enable user interaction with inter-utterance contextualizing computing device 102. In some examples, a user can interact with user interface 205 by engaging input-output devices 203. In some examples, display 206 can be a touchscreen, where user interface 205 is displayed by the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 inter-utterance contextualizing computing device 102 will be operating in. Processor(s) 201 is operable to receive data from, or send data to, a network, such as communication network 118 of FIG. 1, via transceiver 204.

Figure 3:
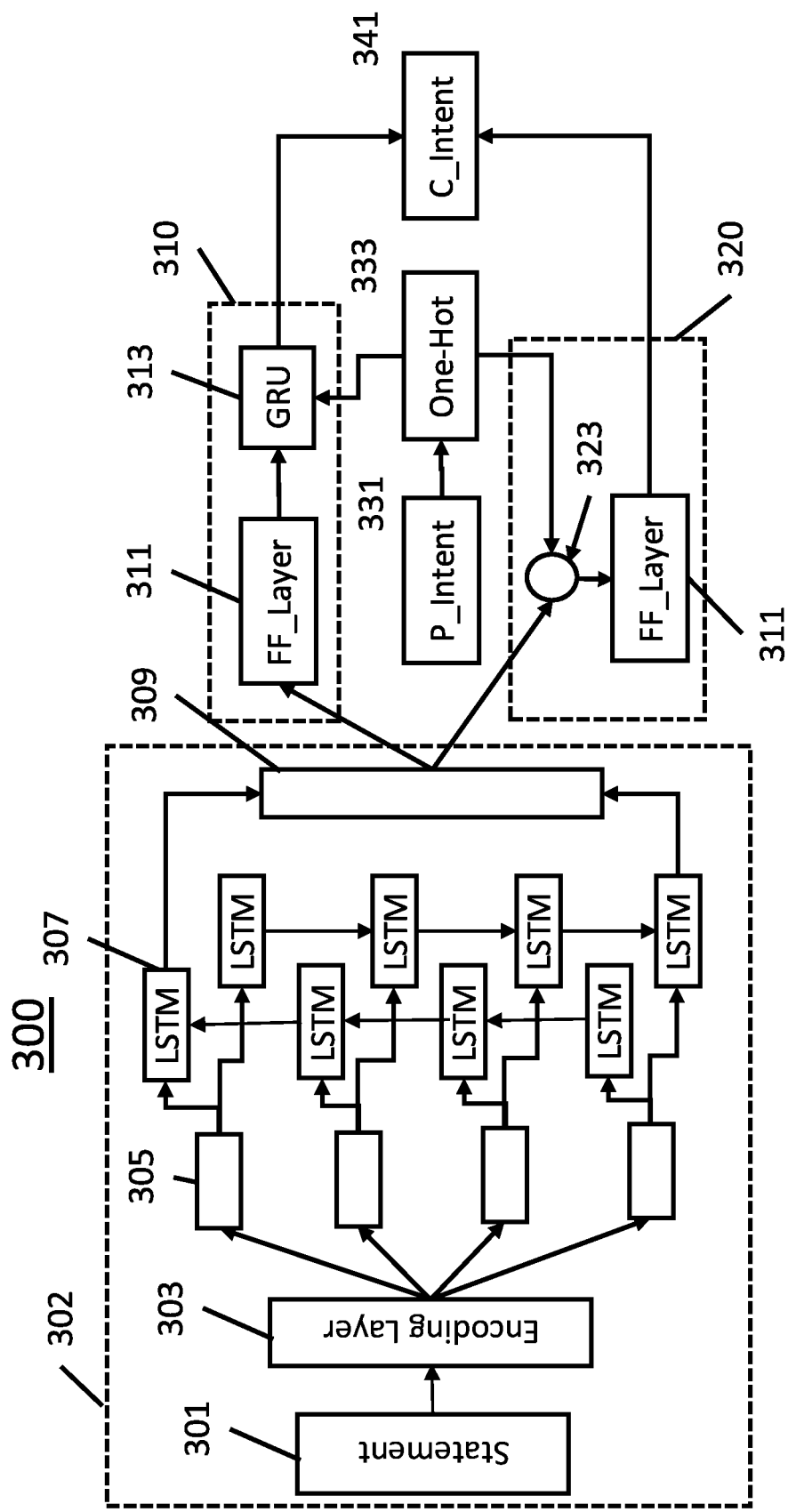
FIG. 3 is an illustration showing the architecture of a NLU in accordance with an embodiment the disclosure.

FIG. 3 is an illustration showing an architecture encompassing embodiments of the subject NLU component of the voice recognition system. The NLU component is divided into two systems, initial intent recognition 302 and modified intent recognition 310, 320. The initial intent recognition system 302 may be common to all embodiments. The modified recognition system 310, 320 may have multiple embodiments. This way the NLU component may use multiple embodiments simultaneously. The initial recognition system include an encoding layer 303, a bi-directional long short term memory (Bi-LSTM) neural network, made up of a plurality of LSTMs 307.

An example configuration of an LSTM is described in "Bidirectional LSTM-CRF Models for Sequence Tagging" August 2015 by Huang et. al. ("Huang") and shown in FIG. 4A. An example architecture of a Bi-LSTM neural network is also described by Huang and shown in FIG. 4B. The system may receive an input text statement 301 at encoding layer 303 which parses input text into single words 305 to be forwarded to various LSTMs 307 within the Bi-LSTM neural network. The Bi-LSTM generates an intent vector 309 encoding of the input text, from the key words.

The combined recognition system may have multiple embodiments. In accordance with one embodiment the combined recognition system may have a feed forward layer 311 which may receive the intent vector 309. The feed forward layer may then forward the intent vector to a gated recurrent unit (GRU). The GRU may be a neural network as described in "Empirical evaluation of gated recurrent neural networks on sequence modeling" by Chung et al. 2014. As shown in FIG. 3 the GRU 313 produces a weighted summation previous vector with an incoming vector. Thus in accordance with one embodiment, the GRU may combine the intent vector 309 with a one-hot vector 333, generated from a previously stored intent vector 331. The combination generating a combined intent vector 341. The combined intent vector 341 may be forwarded to forward to the DM and/or stored for combination with subsequent intent vector.

In another embodiment the combined recognition system may have a summation layer. The summation layer may receive the intent vector from the splitter array. The summation layer may concatenate the intent vector to the one-hot vector generating a combined vector. A feed forward layer may receive the combined vector and forward the vector to the DM and/or stored for combination with subsequent intent vector.

Figure 5:
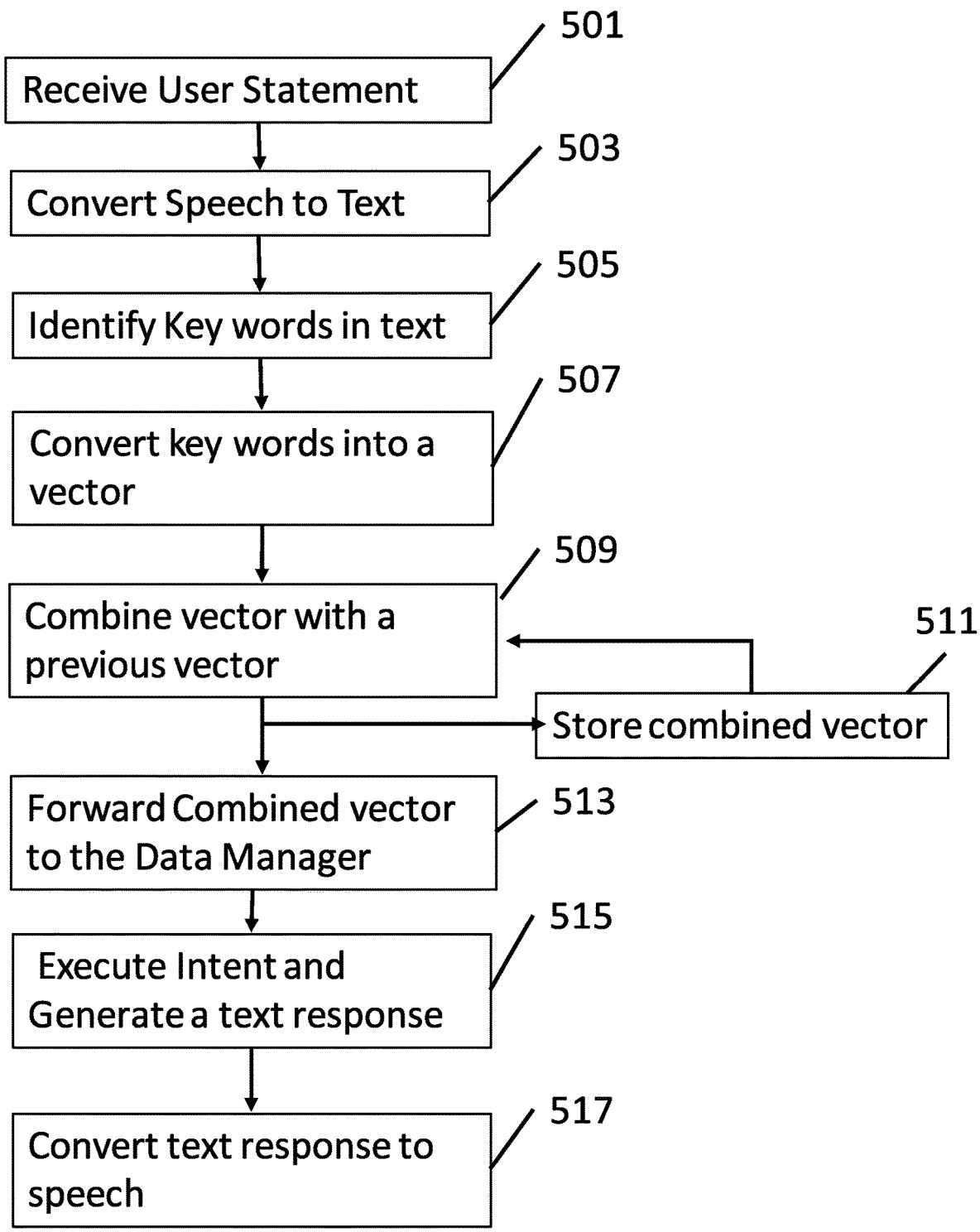
FIG. 5 is flow chart depicting a method of intent classification in accordance with an embodiment of the disclosure.

FIG. 5 depicts a flow diagram of the steps taken the voice recognition system. In step 501 the systems receives a statement by voice from a user. In step 503 a speech to text system will convert the statement into computer text. In Steps 505 and 507 the text statement is parsed to various LSTM units within the Bi-LSTM network. The LSTMs will identify and tag key words and recombine the tagged words into an intent vector representing the condensed statement. In step 509 the intent vector may be combined with a "one-hot-vector," which may be a previously stored intent vector. The combined intent vector may be both stored in step 511 for conversion into a "one-hot-vector" and may be forwarded to the Dialog Manager in step 513. The Dialog Manager may recognize the intent in the combined intent vector, generate instruction to perform the intent and generate a text response to the user in step 515. In step 517 the text response may additionally be converted to speech and conveyed to the user via a speaker in the voice assistant.

Figure 6A:
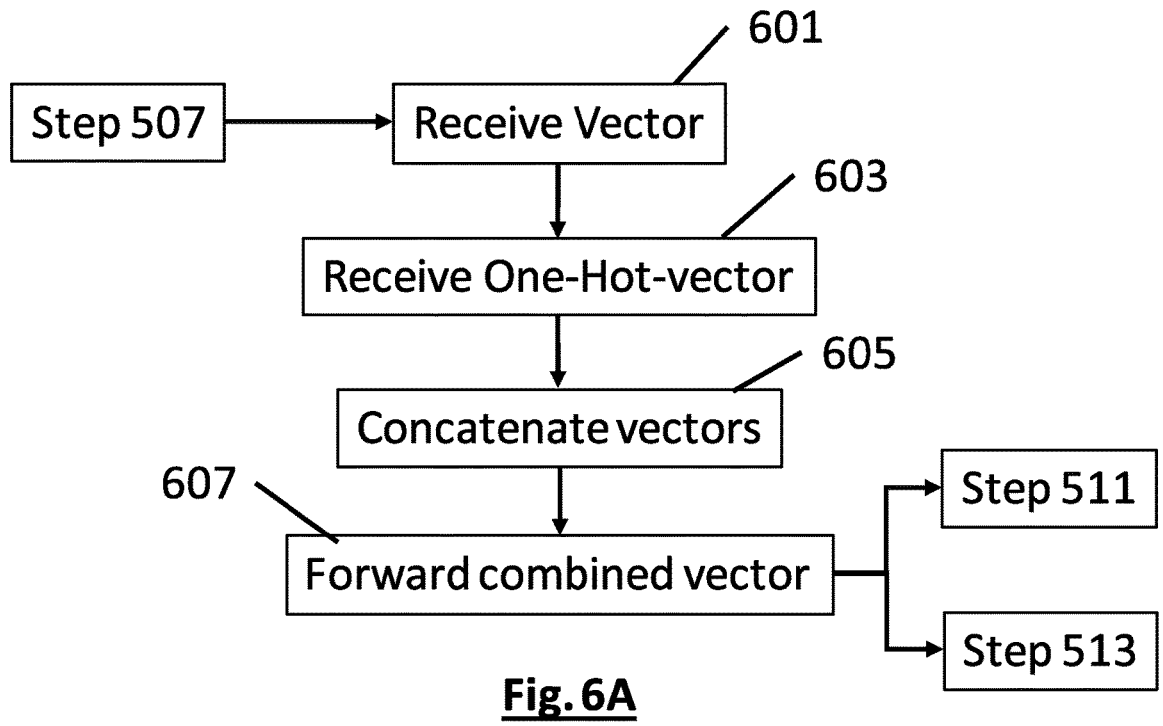
FIG. 6a is flow chart depicting a method generating a combine intent vector in accordance with an embodiment of the disclosure.
Figure 6B:
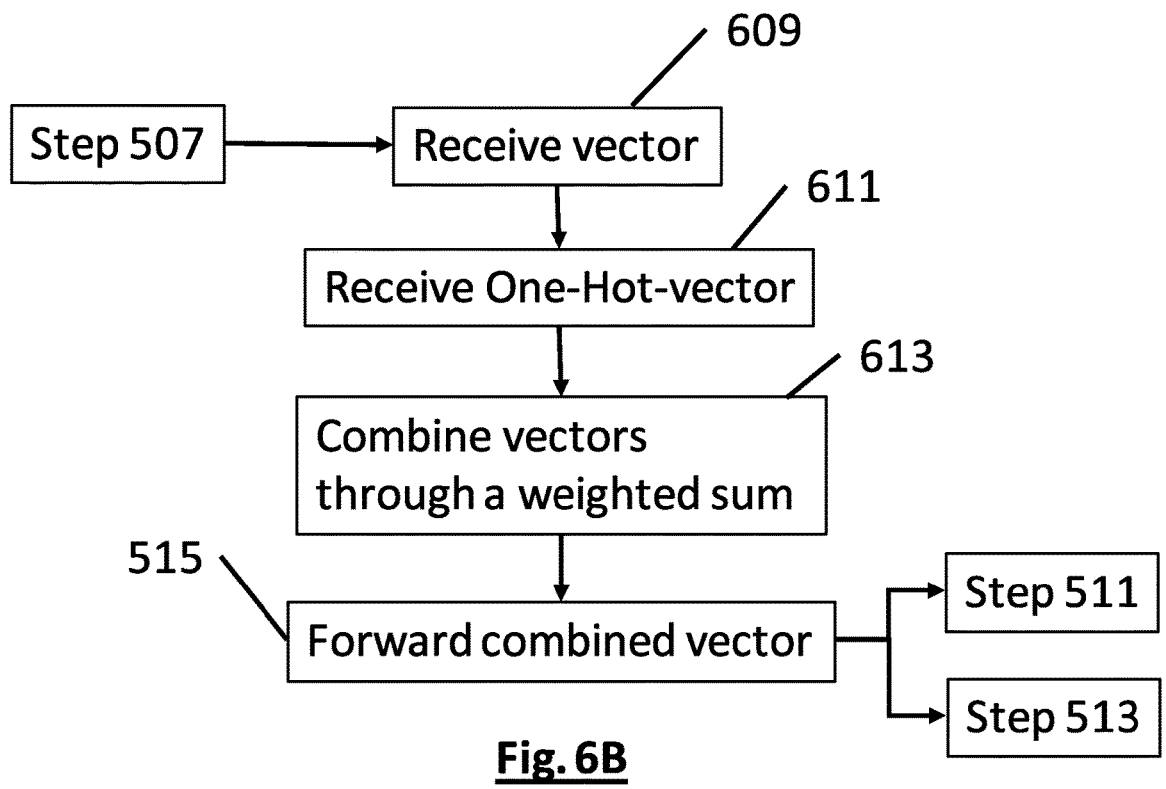
FIG. 6b is a flow chat depicting a method generating a combine intent vector in accordance with an embodiment of the disclosure.

FIG. 6A and FIG. 6B show two non-limiting embodiments for performing step 509. In step 601 of FIG. 6A, the intent vector 309 is received at a summation layer 323. In step 603 a "one-hot-vector 333 is generated from a previously stored vector 331, if one exists. In step 605 the summation layer 323 may concatenate the one-hot-vector 333 to the intent vector 309 forming a combined vector 341. In step 607, the combined vector 341 may then be forwarded by a feed-forward layer 311 to stored and forwarded to a dialog manager as in steps 511 and 513 respectively.

In step 609 of FIG. 6B intent vector 309 is received at a feed forward layer 311. The feed forward layer 311, may transfer the intent vector 309 to a GRU 313. In step 611 a one-hot-vector 333 may be generated form a previously stored vector 331 and forwarded to the GRU 313. In step 613 the GRU 313 may conduct a weighted summation of the intent vector and the one-hot-vector 333. In step 615 the combined vector 341 may be forwarded to be stored of conversion to a one hot vector 333 and may be forwarded to the dialog manager for execution as in steps 511 and 513 respectively.

Testing of this system has shown unexpectedly good results. As shown in Table 1, the Bi-LSTM and GRU based implementation performs best with an overall accuracy of 87.68% on all the live user logs and approximately 90% on the contextual logs.

TABLE 1

Evaluation results for Contextual Intent Classification on 2550 Real User Queries

| Implementation | Oversampling | Intent Accuracy on User Logs (% correct) | | |
| --- | --- | --- | --- | --- |
| | | Glove 6B | Glove 840B | BERT |
| Bi-LSTM + | ✓ | 83.05 | 80.51 | 87.68 |
| FeedForward + GRU | x | 79.12 | 73.64 | 72.98 |
| Bi-LSTM + | ✓ | 86.5 | 86.67 | 86.34 |
| FeedForward | x | 82.58 | 83.39 | 70.57 |

Inference speed plays an important role in production deployment of models. Although the performance of Bidirectional Encoder Representations from Transformers (BERT) based Bi-LSTM+FeedForward+GRU is better than the Global Vectors for Word Representation (GloVe) (840B) based Bi-LSTM+FeedForward, the latency of first (450 milliseconds, averaged over 2550 queries on CPU) one is considerably more than the second (5 milliseconds on CPU). Table 2 shows the inference speeds of different models.

TABLE 2

Inference Speed of Different Models (Averaged Over 2550 Real User Queries)

| Implementation | Word Embedding | Inference Speed (CPU) |
| --- | --- | --- |
| Bi-LSTM + FeedForward + GRU | Glove 6B | ≈5 ms |
| Bi-LSTM + FeedForward + GRU | Glove 840B | ≈5 ms |
| Bi-LSTM + FeedForward + GRU | BERT | ≈450 ms |
| Bi-LSTM + FeedForward | Glove 6B | ≈5 ms |
| Bi-LSTM + FeedForward | Glove 840B | ≈5 ms |
| Bi-LSTM + FeedForward | BERT | ≈450 ms |

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. An automated assistant comprising a communication system and a computing device operably connected to the communication system, the computing device including at least one memory, and a processor, where the processor is configured to:
   receive a first utterance from a user;
   convert the first utterance into a first set of text data;
   parse the first set of text data to identify a first set of key words;

encode a first intent vector from the first set of key words;
store the first intent vector as a first stored vector;
receive a second utterance from a user;
convert the second utterance into a second set of text data;
parse the second set of text data to identify a second set of key words;
encode a second intent vector from the second set of key words;
combine the second intent vector with the first stored vector forming a combined vector;
forward the combined vector to a dialog manager via a feed forward unit;
store a copy of the combined vector as a second stored vector; and
generate a text response to the user based on an intent of the combined vector.

2. The automated assistant of claim 1, wherein the processor is further configured to concatenate the first stored vector to the second intent vector to combine the second intent vector and the first stored vector.

3. The automated assistant of claim 1, wherein the processor is further configured to perform a weighted sum of the second intent vector and the first stored vector to combine the second intent vector and the first stored vector.

4. The automated assistant of claim 3, wherein the processor is further configured to perform the weighted sum via a gated recurrent unit (GRU).

5. The automated assistant of claim 4, wherein the processor is further configured to transfer the second intent vector to the GRU via the feed forward unit.

6. The automated assistant of claim 1, wherein the processor is further configured to form the first intent vector and the second intent vector via a bi-directional long short term memory (Bi-LSTM) network.

7. The automated assistant claim 6, wherein each keyword is encoded by a separate layer in the Bi-LSTM network.

8. The automated assistant of claim 1, wherein the processor is further configured to generate the text response via the dialog manager.

9. The automated assistant claim 1, wherein the processor is further configured to convert the text response to computer-generated speech via a speaker.

10. A computer implemented method of voice recognition and intent classification comprising:
receiving a first utterance from a user;
converting the first utterance into a first set of text data;
parsing the first set of text data to identify a first set of key words;
encoding a first intent vector from the first set of key words;
storing the first intent vector as a first stored vector;
receiving a second utterance from a user;
converting the second utterance into a second set of text data;
parsing the second set of text data to identify a second set of key words;
encoding a second intent vector from the second set of key words;
combining the second intent vector with the first stored vector forming a combined vector;
forwarding the combined vector to a dialog manager via a feed forward unit;
storing a copy of the combined vector as a second stored vector; and
generating a text response to the user based on an intent of the combined vector.

11. The method claim 10, wherein the step of forming a combined vector further comprises concatenating the first stored vector to the second intent vector.

12. The method of claim 10 wherein the step of forming a combined vector further comprises performing a weighted sum of the second intent vector and the first stored vector.

13. The method of claim 12, further comprising transferring the second intent vector to a gated recurrent unit (GRU), wherein the step of performing a weighted sum is performed by the GRU.

14. The method of claim 10, wherein the steps of forming a first intent vector and forming a second intent vector are performed by a bi-directional long short term memory (Bi-LSTM) network.

15. The method of claim 14, wherein each keyword is encoded by a separate layer in the Bi-LSTM network.

16. The method of claim 10 wherein the step of generating a text response is performed by the dialog manager.

17. The method of claim 10, further comprising converting the text response to computer-generated speech via a speaker.

18. A non-transitory computer readable medium having instructions stored thereon, wherein the instructions, when executed by at least one processor, cause a device to perform operations comprising:
receiving a first utterance from a user;
converting the first utterance into a first set of text data;
parsing the first set of text data to identify a first set of key words;
encoding a first intent vector from the first set of key words;
storing the first intent vector as a first stored vector;
receiving a second utterance from a user;
converting the second utterance into a second set of text data;
parsing the second set of text data to identify a second set of key words;
encoding a second intent vector from the second set of key words;
combining the second intent vector with the first stored vector forming a combined vector;
forwarding the combined vector to a dialog manager via a feed forward unit;
storing a copy of the combined vector as a second stored vector; and
generating a text response to the user based on am intent of the combined vector.

19. The non-transitory computer readable medium of claim 18, wherein combining the second intent vector with the first stored vector comprises concatenating the first stored vector to the second intent vector or performing a weighted sum of the second intent vector and the first stored vector.

20. The non-transitory computer readable medium of claim 18, wherein each keyword is encoded by a separate layer in a bi-directional long short term memory (Bi-LSTM) network.

* * * * *